(12) United States Patent
Miyawaki

(10) Patent No.: US 8,661,127 B2
(45) Date of Patent: Feb. 25, 2014

(54) INFORMATION PROCESSING APPARATUS, INFORMATION PROCESSING METHOD, NON-TRANSITORY COMPUTER READABLE MEDIUM STORING PROGRAM, AND INFORMATION PROCESSING SYSTEM

(75) Inventor: Tadamitsu Miyawaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 120 days.

(21) Appl. No.: 13/251,829

(22) Filed: Oct. 3, 2011

(65) Prior Publication Data

US 2012/0246221 A1 Sep. 27, 2012

(30) Foreign Application Priority Data

Mar. 25, 2011 (JP) .................. 2011-068727

(51) Int. Cl.
*G06F 15/16* (2006.01)
(52) U.S. Cl.
USPC ............ 709/225; 717/169; 717/173; 709/237
(58) Field of Classification Search
USPC .................. 709/203, 168–173, 225, 237; 717/168–173
See application file for complete search history.

(56) References Cited

U.S. PATENT DOCUMENTS

| 7,007,077 | B1 * | 2/2006 | Shinohara et al. ............ 709/220 |
| 7,100,158 | B2 * | 8/2006 | Nakane et al. ................. 717/172 |
| 7,287,068 | B1 * | 10/2007 | Eriksson et al. ............... 709/221 |
| 7,290,257 | B2 * | 10/2007 | Henig et al. ................... 717/176 |
| 2002/0078085 | A1 * | 6/2002 | Kikuchi ...................... 707/501.1 |
| 2006/0184927 | A1 * | 8/2006 | Deblaquiere et al. ......... 717/168 |
| 2007/0195770 | A1 * | 8/2007 | Kimura et al. ................. 370/390 |
| 2008/0163337 | A1 * | 7/2008 | Tuliani et al. ..................... 726/2 |
| 2008/0189693 | A1 * | 8/2008 | Pathak .......................... 717/168 |
| 2009/0235244 | A1 * | 9/2009 | Enomori et al. ............... 717/170 |
| 2012/0110074 | A1 * | 5/2012 | Getchius ....................... 709/204 |
| 2012/0240244 | A1 * | 9/2012 | Orazi et al. ..................... 726/29 |

FOREIGN PATENT DOCUMENTS

JP 2009-086960 A 4/2009

* cited by examiner

*Primary Examiner* — Patrice Winder
*Assistant Examiner* — Eyob Hagos
(74) *Attorney, Agent, or Firm* — Sughrue Mion, PLLC

(57) ABSTRACT

An information processing apparatus includes a memory storing an allowance list, a first receiving unit that receives a first request from a client apparatus, a first transmitting unit that transmits the first request to a management server, a second receiving unit that receives a first response which include first location information indicating a position of a storage server storing software from the management server, an adding unit that adds the first location information to the allowance list, a second transmitting unit that transmits the first response to the client apparatus, a third receiving unit that receives a second request including second location information from the client apparatus, a third transmitting unit that transmits the second request to the storage server, a fourth receiving unit that receives a second response from the storage server, and a fourth transmitting unit that transmits the second response to the client apparatus.

19 Claims, 12 Drawing Sheets

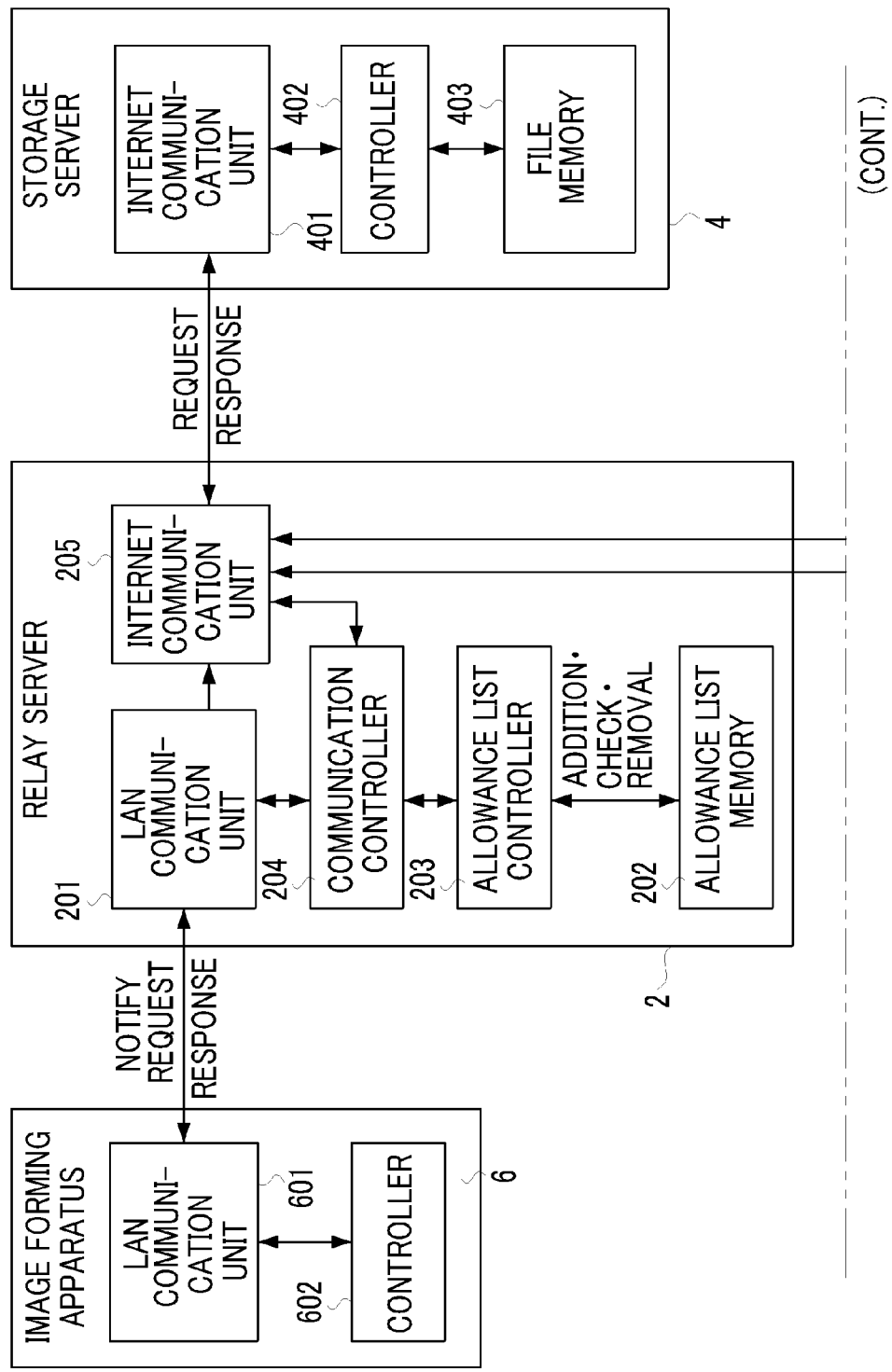

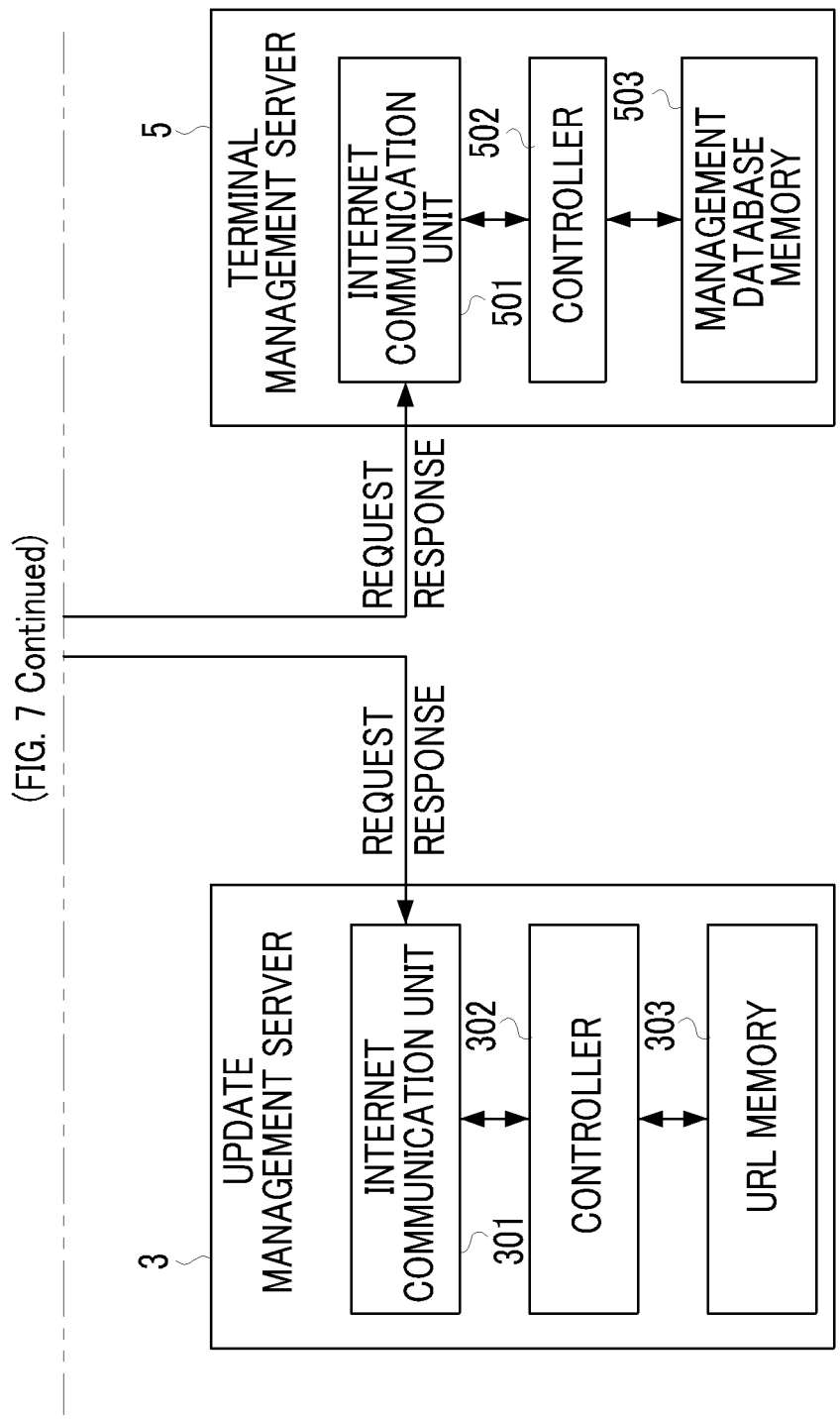

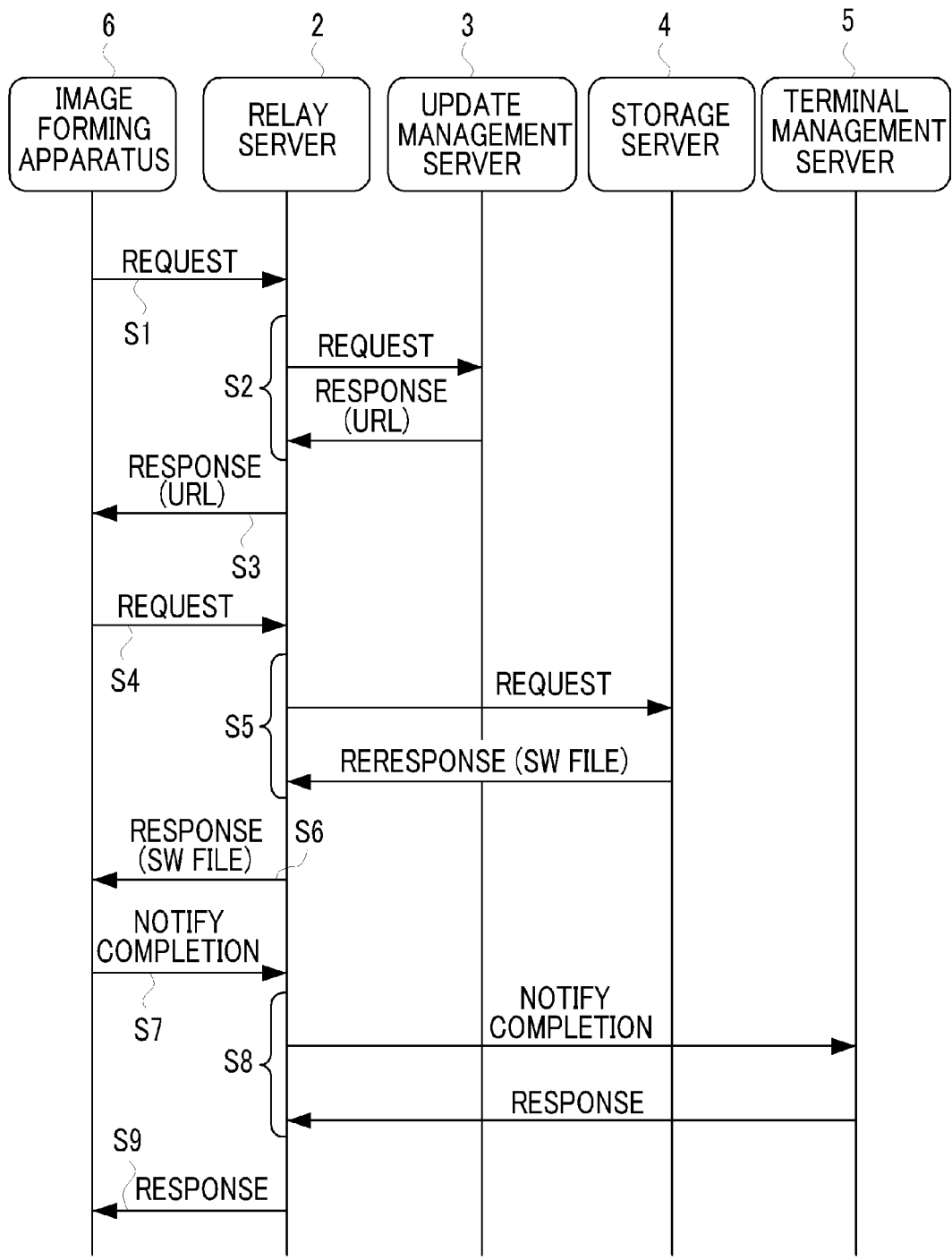

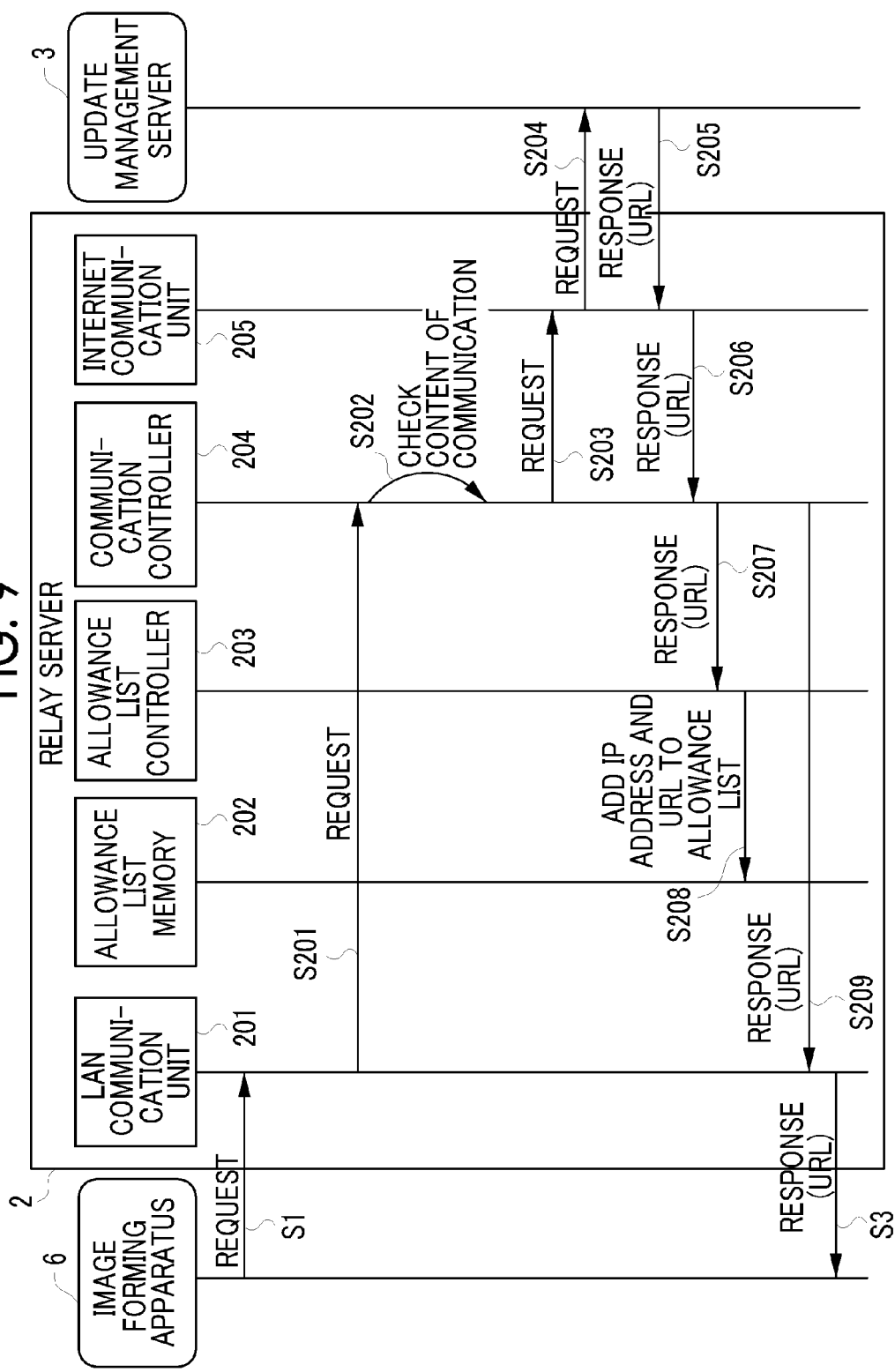

FIG. 10

| IP ADDRESS | URL |
|---|---|
| 111.111.111.11 | http://AAA/AAA.jp |
| 111.111.111.22 | http://BBB/BBB.jp |
| 111.111.111.33 | http://CCC/CCC.jp |
| ⋮ | ⋮ |

FIG. 13

| IP ADDRESS | URL |
|---|---|
| 111.111.111.11 | http://AAA/AAA.jp |
| 111.111.111.33 | http://CCC/CCC.jp |
| ⋮ | ⋮ |

US 8,661,127 B2

INFORMATION PROCESSING APPARATUS, INFORMATION PROCESSING METHOD, NON-TRANSITORY COMPUTER READABLE MEDIUM STORING PROGRAM, AND INFORMATION PROCESSING SYSTEM

CROSS-REFERENCE TO RELATED APPLICATIONS

This application is based on and claims priority under 35 USC 119 from Japanese Patent Application No. 2011-068727 filed Mar. 25, 2011.

BACKGROUND (i) Technical Field

The present invention relates to an information processing apparatus, an information processing method, a non-transitory computer readable medium storing a program, and an information processing system.

(ii) Related Art

A system has been developed which manages a connection destination using a white list in communication on the Internet.

SUMMARY

According to an aspect of the invention, there is provided an information processing apparatus including: a memory that stores an allowance list including location information of a server which is allowed to be connected; a first receiving unit that receives a first request to inquire whether software is updated from a client apparatus; a first transmitting unit that transmits the first request received by the first receiving unit to a management server; a second receiving unit that receives a first response which is transmitted from the management server in response to the first request and includes first location information indicating a position of a storage server storing the software; an adding unit that adds the first location information in the first response received by the second receiving unit to the allowance list; a second transmitting unit that transmits the first response received by the second receiving unit to the client apparatus; a third receiving unit that receives a second request which is a software download request and includes second location information indicating a position of a server, which is a connection destination, from the client apparatus; a third transmitting unit that transmits the second request to the storage server when the second location information in the second request received by the third receiving unit corresponds to the first location information in the allowance list stored in the memory; a fourth receiving unit that receives a second response which is transmitted from the storage server in response to the second request and includes the software; and a fourth transmitting unit that transmits the second response received by the fourth receiving unit to the client apparatus.

BRIEF DESCRIPTION OF THE DRAWINGS

Exemplary embodiments of the present invention will be described in detail based on the following figures, wherein:

FIG. 7 is a block diagram illustrating the functional structure of the information processing system;

FIG. 8 is a sequence chart illustrating a process of the information processing system;

FIG. 9 is a sequence chart illustrating the internal process of the relay server;

FIG. 10 is a diagram illustrating an example of an allowance list;

FIG. 13 is a diagram illustrating an example of the allowance list after a removal process.

DETAILED DESCRIPTION

Figure 1:
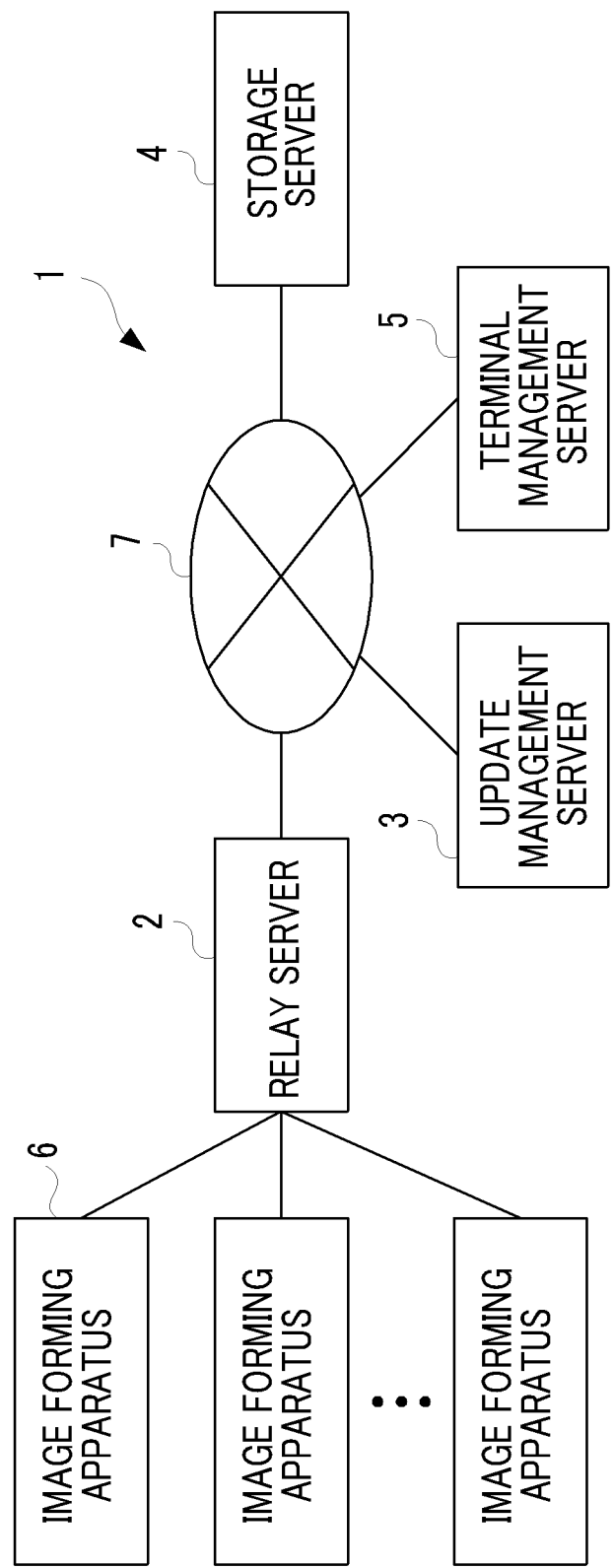
FIG. 1 is a diagram illustrating the overall structure of an information processing system according to an exemplary embodiment of the invention.

FIG. 1 is a diagram illustrating the overall structure of an information processing system 1 according to an exemplary embodiment of the invention. The information processing system 1 includes a relay server 2, an update management server 3, a storage server 4, a terminal management server 5, and an image forming apparatus 6. The relay server 2, the update management server 3, the storage server 4, and the terminal management server 5 are connected to each other through an external network 7. The external network 7 is, for example, the Internet. The relay server 2 and the image forming apparatus 6 are connected to each other through an internal network. The internal network is, for example, a wired or wireless LAN (Local Area Network). The relay server 2 (an example of an information processing apparatus) is provided at the boundary between the internal network and the external network. The relay server 2 is a proxy server that is connected to the external network instead of the image forming apparatus 6 connected to the internal network. The update management server 3 and the terminal management server 5 (an example of a management server) are for maintaining or managing the image forming apparatus 6. The storage server 4 (an example of a storage server) stores software for controlling the image forming apparatus 6. The image forming apparatus 6 (an example of a client apparatus) functions as, for example, a copier, a printer, a scanner, and a facsimile. Communication between the image forming apparatus 6 and the storage server 4 is performed by plain text based on an HTTP (Hypertext Transfer Protocol). Communication among the image forming apparatus 6, the update management server 3, and the terminal management server 5 is performed by HTTPS (Hypertext Transfer Protocol Security). The security of the communication by HTTPS is ensured by an authentication function and an encoding function by an SSL (Secure Sockets Layer). An apparatus including a fire wall is provided between the relay server 2 and the external network 7 (not shown). The fire wall monitors the communication between the internal network and the external network, prevents illegal access or intrusion from the external network, and maintains the security of the internal network.

In the above-mentioned structure, the image forming apparatus 6 communicates with the update management server 3, the storage server 4, and the terminal management server 5 through the relay server 2 and downloads software.

Figure 2:
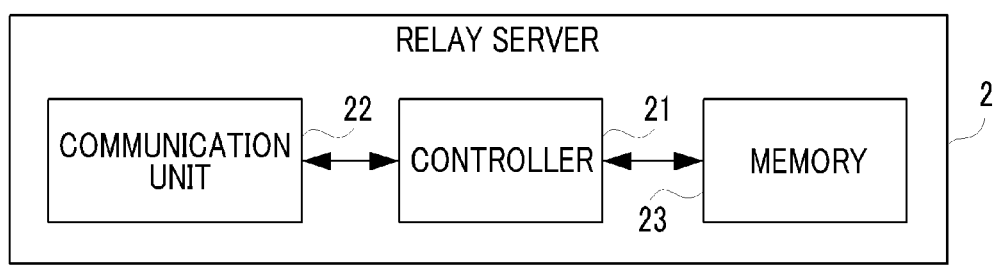
FIG. 2 is a block diagram illustrating the hardware structure of a relay server.

FIG. 2 is a block diagram illustrating the hardware structure of the relay server 2. The relay server 2 is a computer including a controller 21, a communication unit 22, and a memory 23. A controller 21 (an example of a controller) controls the operation of each unit of the relay server 2. The controller 21 includes a CPU (Central Processing Unit), a ROM (Read Only Memory), and a RAM (Random Access Memory). The communication unit 22 (an example of a communication unit) performs communication through the external network 7 or the internal network. The memory 23 (an example of a memory) is a storage device that stores data and programs and is, for example, an HDD (Hard Disk Drive). The memory 23 stores data and programs used by the controller 21.

Figure 3:
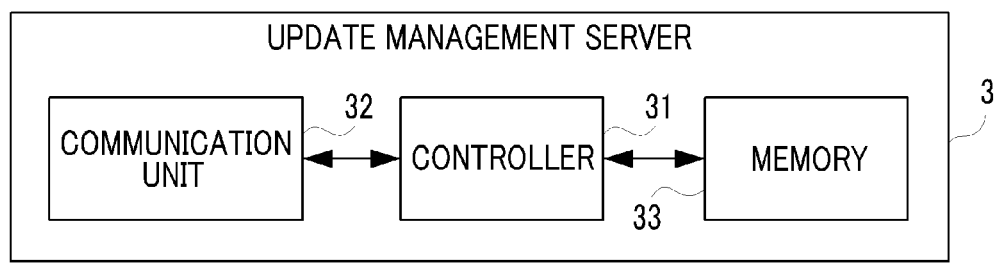
FIG. 3 is a block diagram illustrating the hardware structure of an update management server.

FIG. 3 is a block diagram illustrating the hardware structure of the update management server 3. The update management server 3 is a computer including a controller 31, a communication unit 32, and a memory 33. The controller 31 controls the operation of each unit of the update management server 3. The controller 31 includes a CPU, a ROM, and a RAM. The communication unit 32 performs communication through the external network 7. The memory 33 is a storage device that stores data and programs and is, for example, an HDD. The memory 33 stores data and programs used by the controller 31.

Figure 4:
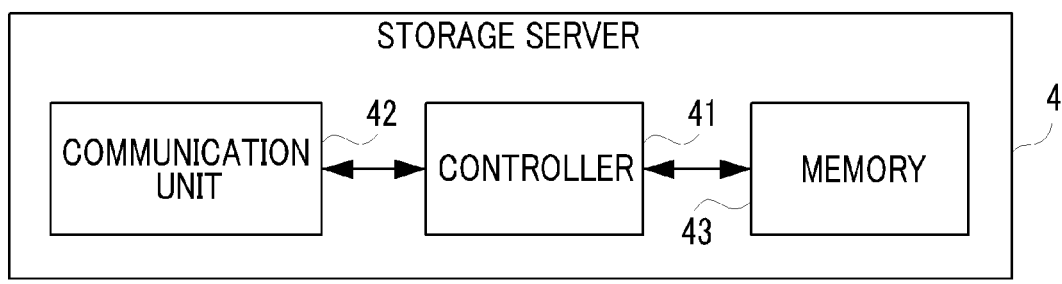
FIG. 4 is a block diagram illustrating the hardware structure of a storage server.

FIG. 4 is a block diagram illustrating the hardware structure of the storage server 4. The storage server 4 is a computer including a controller 41, a communication unit 42, and a memory 43. The operation and structure of each unit are the same as those of the update management server 3 and a description thereof will not be repeated.

Figure 5:
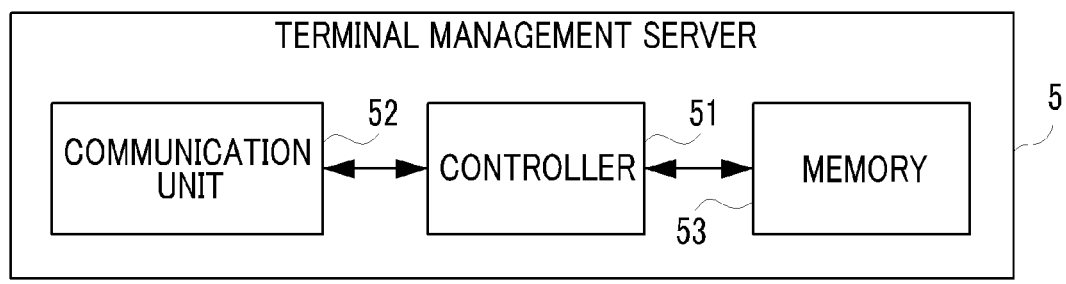
FIG. 5 is a block diagram illustrating the hardware structure of a terminal management server.

FIG. 5 is a block diagram illustrating the hardware structure of the terminal management server 5. The terminal management server 5 is a computer including a controller 51, a communication unit 52, and a memory 53. A description of the operation and structure of each unit will not be repeated.

Figure 6:
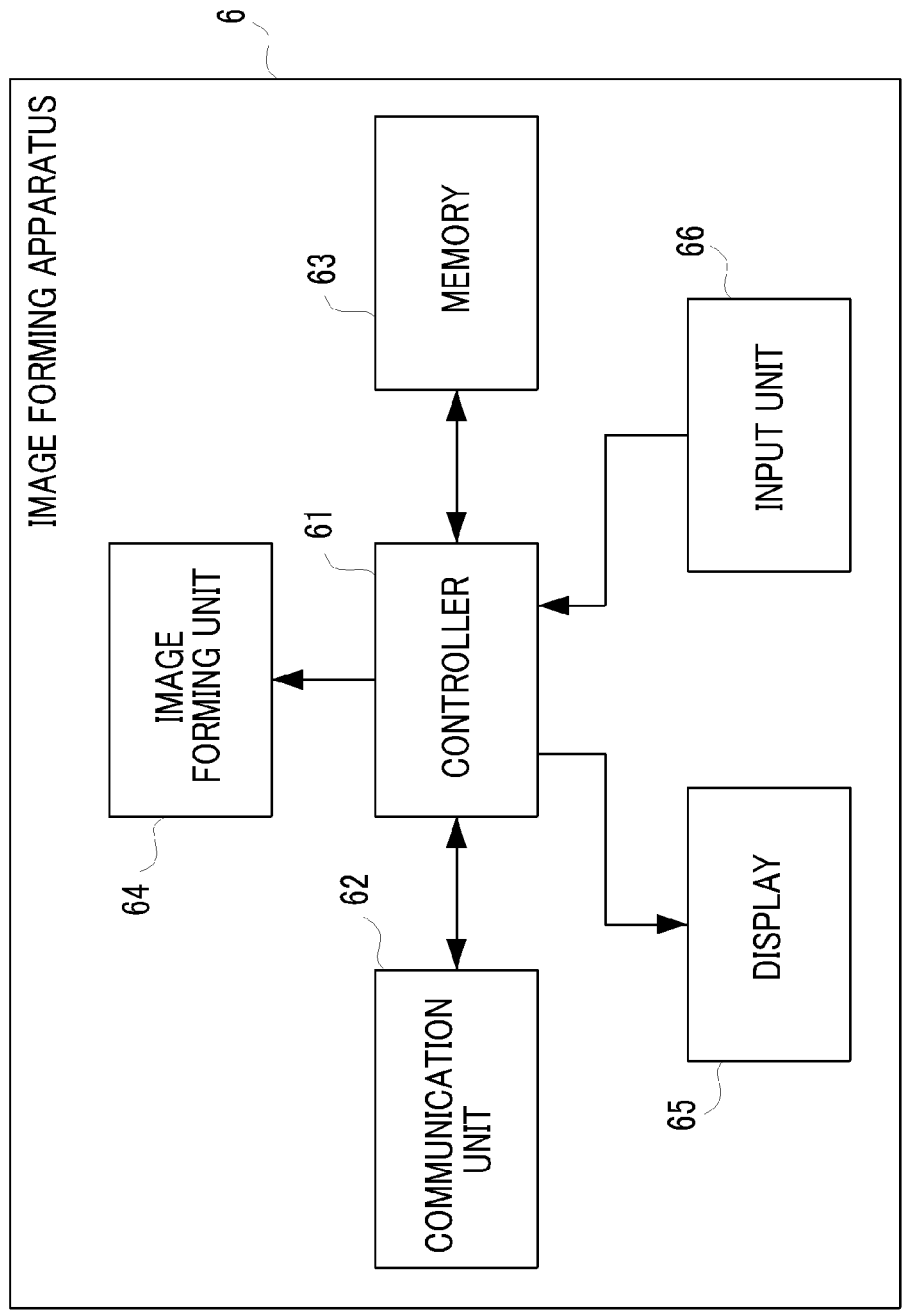
FIG. 6 is a block diagram illustrating the hardware structure of an image forming apparatus.

FIG. 6 is a block diagram illustrating the hardware structure of the image forming apparatus 6. The image forming apparatus 6 is a computer including a controller 61, a communication unit 62, a memory 63, an image forming unit 64, a display 65, and an input unit 66. The controller 61 controls the operation of each unit of the image forming apparatus 6. The controller 61 includes a CPU, a ROM, and a RAM. The communication unit 62 performs communication through the internal network. The memory 63 is a storage device that stores data and programs and is, for example, an HDD. The memory 63 stores data used by the controller 61. The image forming unit 64 forms an image using an electrophotographic method or an ink-jet method. The display 65 is, for example, a liquid crystal display or an organic EL (Electroluminescent) display and displays a menu screen or various kinds of messages or the like for operating the image forming apparatus 6. The input unit 66 includes various keys for inputting information to the image forming apparatus 6. The user operates the input unit 66 to input various instructions or various settings to the image forming apparatus 6.

FIG. 7 is a block diagram illustrating the functional structure of the information processing system 1. The controller 21 of the relay server 2 executes a program to implement functions corresponding to a LAN communication unit 201, an allowance list memory 202, an allowance list controller 203, a communication controller 204, and an Internet communication unit 205. The LAN communication unit 201 (an example of a first receiving unit, a second transmitting unit, a third receiving unit, a fourth transmitting unit, and a fifth receiving unit) communicates with the image forming apparatus 6 through the internal network. The LAN communication unit 201 receives a request and a notice from the image forming apparatus 6. The LAN communication unit 201 transmits a response to the image forming apparatus 6. The Internet communication unit 205 (an example of a first transmitting unit, a second receiving unit, a third transmitting unit, a fourth receiving unit, a fifth transmitting unit, and a sixth receiving unit) communicates with the update management server 3, the storage server 4, and the terminal management server 5 through the external network 7. The Internet communication unit 205 transmits a request to the update management server 3 and the storage server 4 and transmits a notice to the terminal management server 5. The Internet communication unit 205 receives a response from the update management server 3, the storage server 4, and the terminal management server 5. The communication controller 204 (an example of a discard unit) controls the LAN communication unit 201 and the Internet communication unit 205. The allowance list memory 202 (an example of a memory) stores an allowance list. The allowance list controller 203 (an example of an adding unit and a removal unit) adds or removes information to or from the allowance list.

The controller 31 of the update management server 3 executes a program to implement functions corresponding to an Internet communication unit 301, a controller 302, and a URL memory 303. The Internet communication unit 301 (an example of a ninth receiving unit and a ninth transmitting unit) receives a request from the relay server 2 through the external network 7. The Internet communication unit 301 transmits a response to the relay server 2. The controller 302 controls the Internet communication unit 301 and the URL memory 303. The URL memory 303 stores a URL (Uniform Resource Locator) indicating the position of the storage server 4 on the network.

The controller 41 of the storage server 4 executes a program to implement functions corresponding to an Internet communication unit 401, a controller 402, and a file memory 403. The Internet communication unit 401 (an example of an eleventh receiving unit and an eleventh transmitting unit) receives a request from the relay server 2 through the external network 7. The Internet communication unit 401 transmits a response to the relay server 2. The controller 402 controls the Internet communication unit 401 and the file memory 403. The file memory 403 stores software for controlling the image forming apparatus 6.

The controller 51 of the terminal management server 5 executes a program to implement functions corresponding to an Internet communication unit 501, a controller 502, and a management database memory 503. The Internet communication unit 501 (an example of a tenth receiving unit and a tenth transmitting unit) receives a notice from the relay server 2 through the external network 7. The Internet communication unit 501 transmits a response to the relay server 2. The controller 502 controls the Internet communication unit 501 and the management database memory 503. The management database memory 503 stores a database that manages the version information of the software for controlling the image forming apparatus 6.

The controller 61 of the image forming apparatus 6 executes a program to implement functions corresponding to a LAN communication unit 601 and a controller 602. The LAN communication unit 601 (an example of a sixth transmitting unit, a seventh receiving unit, a seventh transmitting unit, an eighth receiving unit, and an eighth transmitting unit) transmits a request and a notice to the relay server 2 through the internal network. The LAN communication unit 601 receives a response from the relay server 2. The controller 602 controls the LAN communication unit 601.

FIG. 8 is a sequence chart illustrating the process of the information processing system 1. The operation of the image forming apparatus 6 is controlled by software, such as firmware. In some cases, functions are added to the software or software faults are corrected to upgrade the version of the software (an example of the update of the software). Next, an example of the process of the image forming apparatus 6 downloading software whose version is upgraded will be described. The image forming apparatus 6 is installed in, for example, a building, such as an office or a school. The update management server 3 and the terminal management server 5 are managed by a person (service provider) who provides a maintenance service and a management service to the image forming apparatus 6 with high reliability. The service provider constructs a content delivery network (CDN) in order to smoothly transmit a large amount of data. In some cases, the storage server 4 is managed by a third party that provides a content delivery service. The image forming apparatus 6 downloads software whose version is upgraded from the storage server 4 through the CDN.

In Step S1, the image forming apparatus 6 transmits a first request inquiring whether the version of software is upgraded to the relay server 2. The image forming apparatus 6 transmits the first request periodically or in response to the operation of the user. The relay server 2 receives the first request from the image forming apparatus 6. In Step S2, the relay server 2 transmits the first request to the update management server 3. The update management server 3 receives the first request from the relay server 2. The update management server 3 transmits a first response including a URL indicating the position of the storage server 4 on the network to the relay server 2. The relay server 2 receives the first response from the update management server 3. In Step S2, the relay server 2 adds the IP (Internet Protocol) address of the image forming apparatus 6 and the URL included in the first response to the allowance list. The allowance list includes information indicating an opponent that is allowed to be connected. In this exemplary embodiment, the allowance list is a white list including the URL of a communication destination that is allowed to be connected to the relay server 2 through the external network 7. Since the relay server 2 includes the allowance list, the security of the communication of the image forming apparatus 6 through the relay server 2 is ensured. The internal process of the relay server 2 in Step S2 will be described below. In Step S3, the relay server 2 transmits the first response to the image forming apparatus 6. The image forming apparatus 6 receives the first response from the relay server 2.

In Step S4, the image forming apparatus 6 transmits a second request to download software to the relay server 2. The second request includes the URL of a server, which is a connection destination. The relay server 2 receives the second request from the image forming apparatus 6. In Step S5, the relay server 2 checks the allowance list. When the second request is suitable for the allowance list, the relay server 2 transmits the second request to the storage server 4. The storage server 4 receives the second request from the relay server 2. The storage server 4 transmits a second response including software to the relay server 2. The relay server 2 receives the second response from the storage server 4. The internal process of the relay server 2 in Step S5 will be described below. In Step S6, the relay server 2 transmits the second response to the image forming apparatus 6. The image forming apparatus 6 receives the second response from the relay server 2. When receiving the second response, the image forming apparatus 6 completes the download of the software.

In Step S7, the image forming apparatus 6 transmits a completion notice indicating that a process corresponding to the second response has been completed to the relay server 2. The completion of the process corresponding to the second response means, for example, the start or end of the introduction of the downloaded software (for example, the installation of the software). The relay server 2 receives the completion notice from the image forming apparatus 6. In Step S8, the relay server 2 transmits the completion notice to the terminal management server 5. The terminal management server 5 receives the completion notice from the relay server 2. The terminal management server 5 transmits an acknowledgement corresponding to the completion notice to the relay server 2. The acknowledgement corresponding to the completion notice is a response indicating the confirmation of the version information of software that starts to be introduced or has been completely introduced by the image forming apparatus 6. The relay server 2 receives the acknowledgement from the terminal management server 5. In Step S8, the relay server 2 removes the URL and the IP address of the image forming apparatus 6 from the allowance list. The internal process of the relay server 2 in Step S8 will be described below. In Step S9, the relay server 2 transmits the acknowledgement to the image forming apparatus 6. The image forming apparatus 6 receives the acknowledgement from the relay server 2.

FIG. 9 is a sequence chart illustrating the internal process of the relay server 2 in Step S2 of FIG. 8. In Step S201, the LAN communication unit 201 outputs the first request received from the image forming apparatus 6 to the communication controller 204. The communication controller 204 acquires the first request from the LAN communication unit 201. The request transmitted from the image forming apparatus 6 includes an identifier indicating the content of the request. In this example, the first request includes an identifier indicating a request to check whether the version of software is upgraded. In addition, the first request includes the identifier of the software and the identifier of the version information of the software. The first request also includes the IP address of the image forming apparatus 6 as an identifier specifying the image forming apparatus 6, which is the transmission source of the first request.

In Step S202, the communication controller 204 checks the content of communication. The requests transmitted from the image forming apparatus 6 are classified into a request to perform filtering on the basis of the allowance list and a request not to perform filtering on the basis of the allowance list. The communication controller 204 has a list of the requests not to perform filtering. The communication controller 204 compares an identifier indicating the content of the request received from the image forming apparatus 6 with the list of the requests not to perform filtering. When an identifier corresponding to the identifier indicating the content of the request is included in the list, the communication controller 204 determines that the check of the allowance list is not needed. In the first request, the identifier corresponding to the identifier indicating the content of the request is included in the list of the requests not to perform filtering. The list of the requests not to perform filtering includes the URL of the transmission destination of the request. In this example, the communication controller 204 determines that the check of the allowance list is not needed for the first request. The transmission destination of the first request is the update management server 3 with high reliability.

In Step S203, the communication controller 204 outputs the first request to the Internet communication unit 205. The Internet communication unit 205 acquires the first request from the communication controller 204. In Step S204, the Internet communication unit 205 transmits the first request to the update management server 3. The Internet communication unit 301 of the update management server 3 receives the first request from the relay server 2.

The URL memory 303 of the update management server 3 has a URL database including the identifier of software, the identifier of new version information of the software, and the URL of the storage server 4 including the new version software. The controller 302 compares the identifier of the version information of the software in the first request which is received by the Internet communication unit 301 with the identifier of the new version information of the software in the URL database. When the identifiers of the version information do not correspond to each other, the controller 302 acquires the URL of the storage server 4 including the new version software from the URL database. When the identifiers of the version information correspond to each other, the URL acquiring process is not performed.

In Step S205, the Internet communication unit 301 of the update management server 3 transmits the first response to the relay server 2. The Internet communication unit 205 of the relay server 2 receives the first response from the update management server 3. The first response includes the IP address of the image forming apparatus 6 and the URL acquired by the controller 302. In Step S206, the Internet communication unit 205 outputs the first response to the communication controller 204. The communication controller 204 acquires the first response from the Internet communication unit 205. In Step S207, the communication controller 204 outputs the first response to the allowance list controller 203. The allowance list controller 203 acquires the first response from the communication controller 204. When the first response from the update management server 3 includes the URL, the communication controller 204 outputs the first response to the allowance list controller 203. In Step S208, the allowance list controller 203 adds the URL and the IP address of the image forming apparatus 6 to the allowance list.

FIG. 10 is a diagram illustrating an example of the allowance list. The allowance list includes IP addresses and URLs. A set of the IP address and the URL in the first response is added to the allowance list. For example, a URL "http://BBB/BBB.jp" is added for the IP address "111.111.111.22" of the image forming apparatus 6. In this state, the request transmitted from the image forming apparatus 6 with the IP address "111.111.111.22" to the storage server 4 with the URL "http://BBB/BBB.jp" is relayed to the storage server 4.

Referring to FIG. 9 again, in Step S209, the communication controller 204 outputs the first response to the LAN communication unit 201. The LAN communication unit 201 acquires the first response from the communication controller 204. The LAN communication unit 201 transmits the first response to the image forming apparatus 6 with the IP address included in the first response.

In this way, the relay server 2 adds the IP address and the URL to the allowance list while relaying the first request from the image forming apparatus 6 and the first response from the update management server 3.

Figure 11:
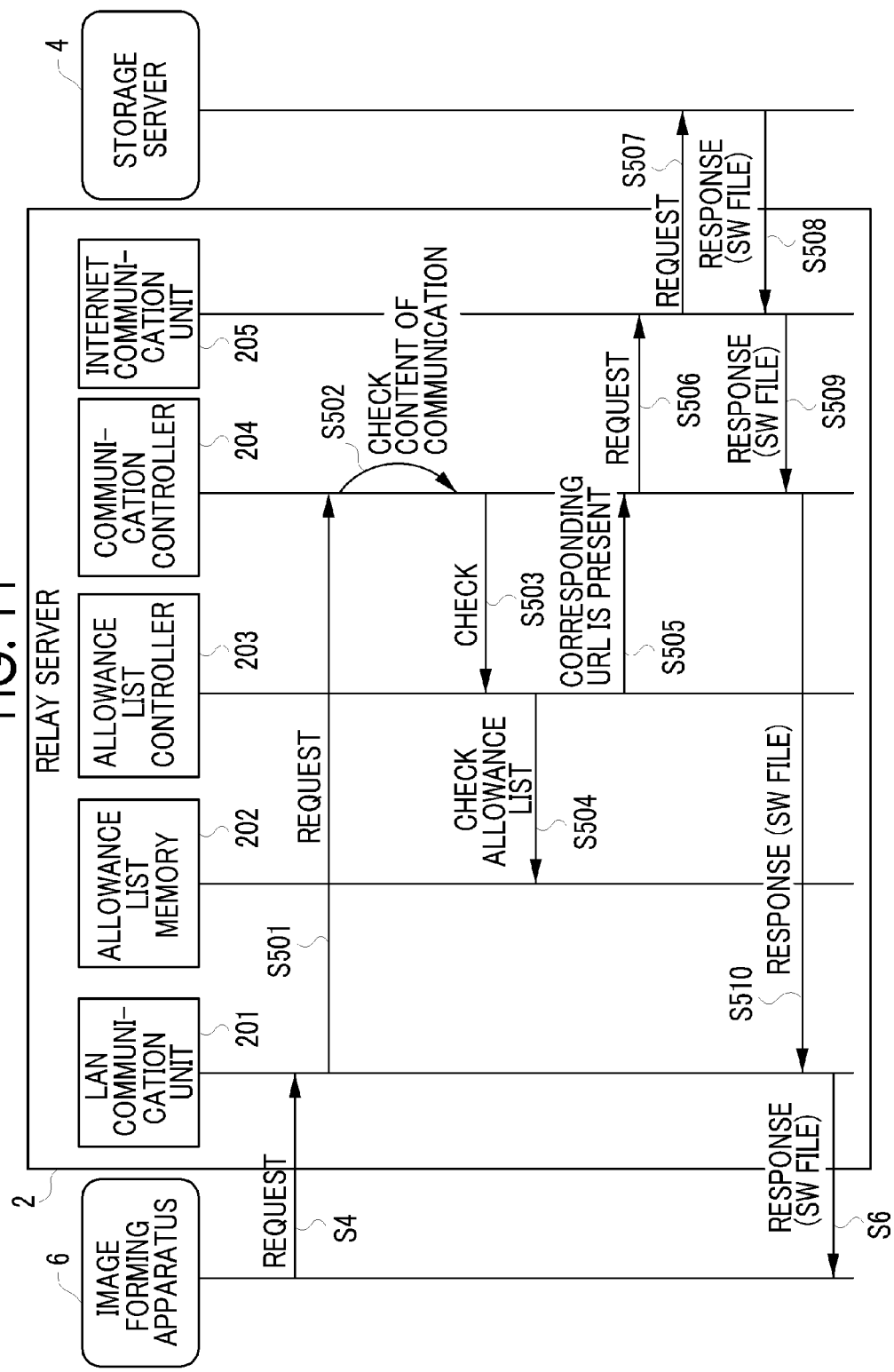
FIG. 11 is a sequence chart illustrating the internal process of the relay server.

FIG. 11 is a sequence chart illustrating the internal process of the relay server 2 in Step S5 of FIG. 8. In Step S501, the LAN communication unit 201 outputs the second request received from the image forming apparatus 6 to the communication controller 204. The communication controller 204 acquires the second request from the LAN communication unit 201. The second request includes an identifier indicating a software download request and the URL of the download destination of software. In addition, the second request includes the IP address of the image forming apparatus 6. In Step S502, the communication controller 204 checks the content of communication. In the second request, an identifier corresponding to the identifier indicating the content of the request is not included in the list of the requests not to perform filtering. The communication controller 204 determines that the check of the allowance list is needed for the second request. In Step S503, the communication controller 204 outputs an allowance list check command to the allowance list controller 203. The allowance list controller 203 acquires the allowance list check command from the communication controller 204. The allowance list check command includes the IP address of the image forming apparatus 6 and the URL of the download destination of software. In Step S504, the allowance list controller 203 checks the allowance list. The allowance list controller 203 compares the IP address of the image forming apparatus 6 and the URL of the download destination of software with those in the allowance list. When a set of the IP address and the URL included in the second request corresponds to a set of the IP address and the URL included in the allowance list, the allowance list controller 203 determines that there is a corresponding URL. In the example shown in FIG. 10, the IP address "111.111.111.22" and the URL "http://BBB/BBB.jp" included in the allowance list check command are also included in the allowance list. Therefore, the allowance list controller 203 determines that there is a corresponding URL.

In Step S505, the allowance list controller 203 outputs the check result to the communication controller 204. The communication controller 204 acquires the check result from the allowance list controller 203. In Step S506, the communication controller 204 outputs the second request to the Internet communication unit 205. The Internet communication unit 205 acquires the second request from the communication controller 204. When a URL corresponding to the URL of the download destination of the software is included in the allowance list, the communication controller 204 outputs the second request. When the second request is illegal, the URL corresponding to the URL of the download destination of the software is not included in the allowance list. In this case, the communication controller 204 discards the second request (not shown). When the second request is discarded, connection to the URL that is not included in the allowance list is prevented. In Step S507, the Internet communication unit 205 transmits the second request to the storage server 4. The Internet communication unit 401 of the storage server 4 receives the second request from the relay server 2. The Internet communication unit 205 transmits the second request to the storage server 4 which is specified by the URL of the download destination of the software in the second request.

When the Internet communication unit 401 receives the second request, the controller 402 acquires the software specified by the second request from the file memory 403. In addition, the controller 402 acquires the identifier of the version information of the software from the file memory 403. The controller 402 outputs the software and the identifier to the Internet communication unit 401. The Internet communication unit 401 acquires the software and the identifier from the controller 402. In Step S508, the Internet communication unit 401 of the storage server 4 transmits the second response to the relay server 2. The Internet communication unit 205 receives the second response from the storage server 4. The second response includes the IP address of the image forming apparatus 6, which is the transmission source of the second request, software, and the identifier of the version information of the software. In Step S509, the Internet communication unit 205 outputs the second response to the communication controller 204. The communication controller 204 acquires the second response from the Internet communication unit 205. In Step S510, the communication controller 204 outputs the second response to the LAN communication unit 201. The LAN communication unit 201 acquires the second response from the communication controller 204. The LAN communication unit 201 transmits the second response to the image forming apparatus 6 having the IP address in the second response.

Figure 12:
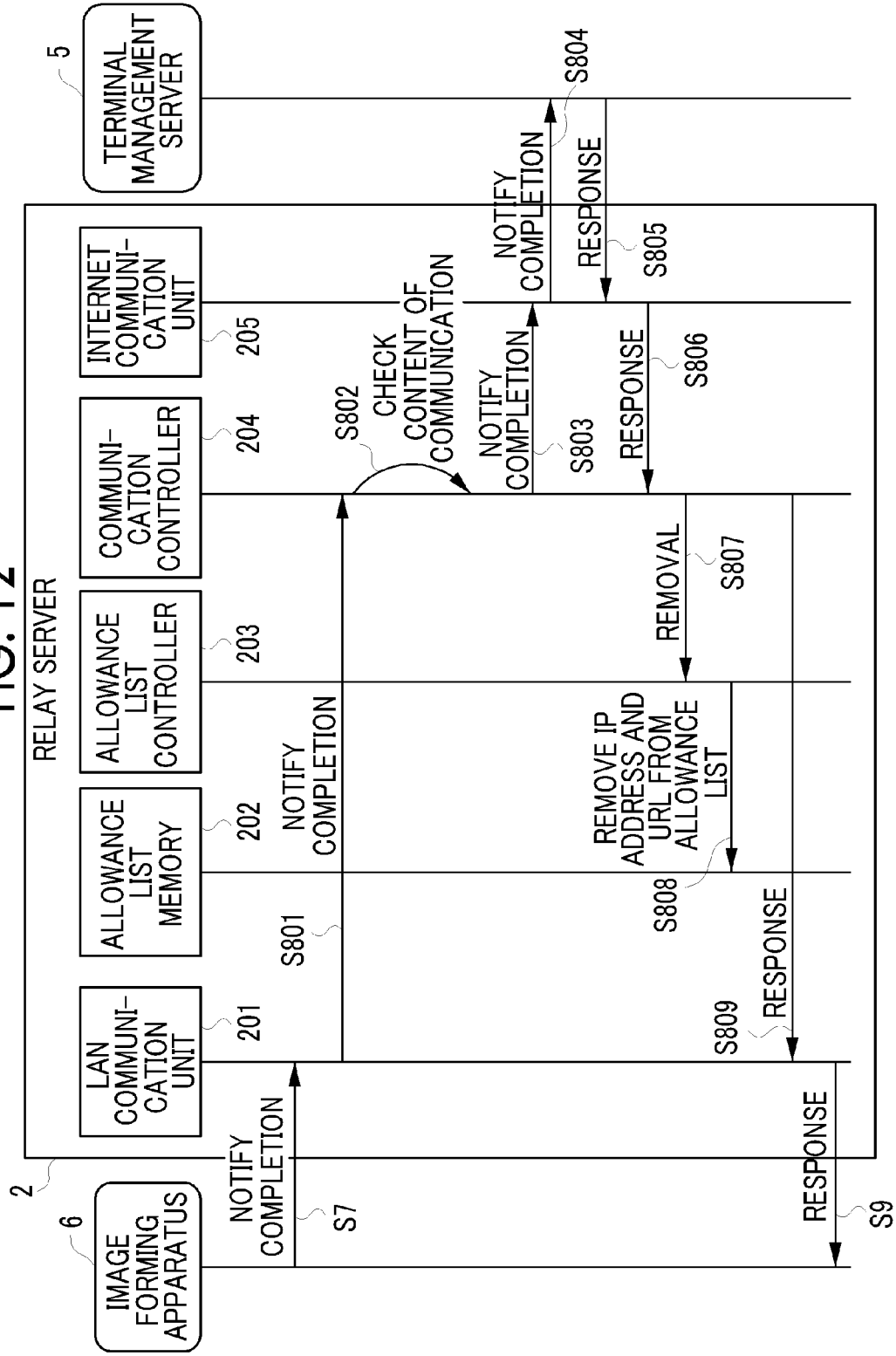
FIG. 12 is a sequence chart illustrating the internal process of the relay server.

FIG. 12 is a sequence chart illustrating the internal process of the relay server 2 in Step S8 of FIG. 8. In Step S801, the LAN communication unit 201 outputs the completion notice received from the image forming apparatus 6 to the communication controller 204. The communication controller 204 acquires the completion notice from the LAN communication unit 201. The completion notice includes an identifier indicating the completion of the process corresponding to the second response and the IP address of the image forming apparatus 6. In addition, the completion notice includes the identifier of the software downloaded by the image forming apparatus 6 and the identifier of the version information of the software. In Step S802, the communication controller 204 checks the content of communication. The list of the requests not to perform filtering includes the identifier of the completion notice. The communication controller 204 determines that the check of the allowance list is not needed for the completion notice. The transmission destination of the completion notice is the terminal management server 5 with high reliability. In Step S803, the communication controller 204 outputs the completion notice to the Internet communication unit 205. The Internet communication unit 205 acquires the completion notice from the communication controller 204. In Step S804, the Internet communication unit 205 transmits the completion notice to the terminal management server 5. The Internet communication unit 501 of the terminal management server 5 receives the completion notice from the relay server 2.

The terminal management server 5 has a management database including the IP address of the image forming apparatus 6, the identifier of the software installed in the image forming apparatus 6, and the identifier of the version information of the software. When the Internet communication unit 501 receives the completion notice, the controller 502 records the identifier of the version information of the downloaded software in the management database, for the IP address and the identifier of the software included in the completion notice. When the identifier is recorded in the management database, the controller 502 acquires data indicating the check of the process corresponding to the completion notice from the management database. In Step S805, the Internet communication unit 501 transmits an acknowledgement to the relay server 2. The Internet communication unit 205 receives the acknowledgement from the terminal management server 5. The acknowledgement includes the data indicating the check of the process corresponding to the completion notice and the IP address of the image forming apparatus 6. In Step S806, the Internet communication unit 205 outputs the acknowledgement to the communication controller 204. The communication controller 204 acquires the acknowledgement from the Internet communication unit 205. In Step S807, the communication controller 204 outputs a command to remove the information included in the allowance list to the allowance list controller 203. The allowance list controller 203 acquires the removal command from the communication controller 204. The removal command includes the IP address of the image forming apparatus 6. In Step S808, the allowance list controller 203 removes the information included in the allowance list. Specifically, the allowance list controller 203 removes the IP address in the removal command and the URL corresponding to the IP address from the allowance list.

FIG. 13 is a diagram illustrating an example of the allowance list after the removal process. When the IP address included in the acknowledgement is "111.111.111.22", the IP address and the URL "http://BBB/BBB.jp" are removed from the allowance list. Whenever the image forming apparatus 6 performs the software download process, the IP address and the URL are removed from the allowance list. Therefore, the security of communication is ensured.

In Step S809, the communication controller 204 outputs the acknowledgement to the LAN communication unit 201. The LAN communication unit 201 acquires the acknowledgement from the communication controller 204. The LAN communication unit 201 transmits the acknowledgement to the image forming apparatus 6 with the IP address included in the acknowledgement.

In this way, the relay server 2 removes the IP address and the URL from the allowance list while relaying the completion notice from the image forming apparatus 6 and the acknowledgement from the terminal management server 5.

The invention is not limited to the above-described exemplary embodiment, but various modifications may be made. Next, some modifications will be described. Two or more modifications among the following modifications may be combined with each other.

(1) Modification 1

The client apparatus is not limited to the image forming apparatus. The client apparatus may be an information terminal which may be connected to the Internet, such as a personal computer or a mobile phone.

(2) Modification 2

The update management server and the terminal management server may be physically integrated into one server. For example, as hardware, a single management server may execute a program for functioning as the update management server and a program for functioning as the terminal management server to have the functions of both the update management server and the terminal management server. Alternatively, the information processing system 1 may not include the terminal management server 5. In this case, Steps S7 to S9 may be omitted.

(3) Modification 3

The location information is not limited to the URL. For example, information including a host name and elements of a directory may be used. Alternatively, an IP address may be used as the location information.

(4) Modification 4

An IP address may not be used to check whether the corresponding location information is included in the allowance list. In this case, when the corresponding location information is included in the allowance list, a request is relayed. In the example shown in FIG. 10, when an IP address "111.111.111.22" and a URL "http://AAA/AAA.jp" are included in the allowance list check command, the allowance list controller 203 determines that there is a corresponding URL.

(5) Modification 5

The identifier of the client apparatus is not limited to the IP address. For example, the identifier of the client apparatus may be an identifier allocated to each client apparatus by the service provider.

(6) Modification 6

The encoding method in the communication between the client apparatus and the management server is not limited to SSL. For example, an encoding method using an SHTTP (Secure Hyper Text Transfer Protocol) or an IPsek (Security Architecture for Internet Protocol) may be used.

(7) Modification 7

In the above-described exemplary embodiment, the program executed by the relay server 2, the update management server 3, the storage server 4, the terminal management server 5, or the image forming apparatus 6 may be stored in a computer-readable recording medium, such as a magnetic recording medium (for example, a magnetic tape, a magnetic disk (an HDD or an FD (Flexible Disk))), an optical recording medium (for example, an optical disk (a CD (Compact Disk) or a DVD (Digital Versatile Disk))), a magneto-optical recording medium, or a semiconductor memory (for example, a flash ROM) and then provided. In addition, the program may be downloaded through a network, such as the Internet.

(8) Modification 8

The information processing apparatus, the client apparatus, the management server, and the storage server may not be connected to each other through the internal network and the external network 7. The information processing apparatus, the client apparatus, the management server, and the storage server may be directly connected to each other.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a memory that stores an allowance list including location information of a server which is allowed to be connected;
   a first receiving unit that receives, from a client apparatus, a first request to inquire whether software is updated;
   a first transmitting unit that transmits the first request received by the first receiving unit to a management server;
   a second receiving unit that receives a first response which is transmitted from the management server in response to the first request and includes first location information indicating a location of a storage server storing the software;
   an adding unit that adds the first location information in the first response received by the second receiving unit to the allowance list;
   a second transmitting unit that transmits the first response received by the second receiving unit to the client apparatus;
   a third receiving unit that receives, from the client apparatus, a second request which is a software download request and includes second location information indicating a location of a server, which is a connection destination;
   a third transmitting unit that transmits the second request to the storage server when the second location information in the second request received by the third receiving unit corresponds to the first location information in the allowance list stored in the memory;
   a fourth receiving unit that receives a second response which is transmitted from the storage server in response to the second request and includes the software;
   a fourth transmitting unit that transmits the second response received by the fourth receiving unit to the client apparatus;
   a fifth receiving unit that receives a completion notice indicating the completion of a process corresponding to the second response from the client apparatus;
   a fifth transmitting unit that transmits the completion notice received by the fifth receiving unit to the management server;
   a sixth receiving unit that receives an acknowledgement which corresponds to the completion notice and is transmitted from the management server in response to the completion notice; and
   a removal unit that removes the identifier and the first location information corresponding to the identifier from the allowance list in response to the acknowledgement received by the sixth receiving unit.

2. The information processing apparatus according to claim 1,
   wherein the allowance list includes an identifier of the client apparatus, and
   the adding unit adds the identifier and the first location information to the allowance list so as to correspond to each other.

3. The information processing apparatus according to claim 1, further comprising:
   a discard unit that discards the second request when the second location information in the second request received by the third receiving unit does not correspond to the first location information in the allowance list stored in the memory.

4. The information processing apparatus according to claim 2, further comprising:
   a discard unit that discards the second request when the second location information in the second request received by the third receiving unit does not correspond to the first location information in the allowance list stored in the memory.

5. The information processing apparatus according to claim 2, further comprising:
   a discard unit that discards the second request when the second location information in the second request received by the third receiving unit does not correspond to the first location information in the allowance list stored in the memory.

6. The information processing apparatus according to claim 1,
   wherein communication between the client apparatus and the management server is encrypted.

7. The information processing apparatus according to claim 2,
   wherein communication between the client apparatus and the management server is encrypted.

8. The information processing apparatus according to claim 1,
wherein communication between the client apparatus and the management server is encrypted.

9. The information processing apparatus according to claim 3,
wherein communication between the client apparatus and the management server is encrypted.

10. The information processing apparatus according to claim 4,
wherein communication between the client apparatus and the management server is encrypted.

11. The information processing apparatus according to claim 5,
wherein communication between the client apparatus and the management server is encrypted.

12. The information processing apparatus according to claim 6,
wherein communication with the storage server is performed by plain text.

13. The information processing apparatus according to claim 7,
wherein communication with the storage server is performed by a plain text.

14. The information processing apparatus according to claim 8,
wherein communication with the storage server is performed by a plain text.

15. The information processing apparatus according to claim 9,
wherein communication with the storage server is performed by a plain text.

16. The information processing apparatus according to claim 10,
wherein communication with the storage server is performed by plain text.

17. An information processing method comprising:
storing an allowance list including location information of a server which is allowed to be connected;
receiving, from a client apparatus, a first request to inquire whether software is updated;
transmitting the first request to a management server;
receiving a first response which is transmitted from the management server in response to the first request and includes first location information indicating a location of a storage server storing the software;
adding the first location information in the first response to the allowance list;
transmitting the first response to the client apparatus;
receiving, from the client apparatus, a second request which is a software download request and includes second location information indicating a location of a server, which is a connection destination;
transmitting the second request to the storage server when the second location information in the second request corresponds to the first location information in the stored allowance list;
receiving a second response which is transmitted from the storage server in response to the second request and includes the software;
transmitting the second response to the client apparatus;
receiving a completion notice indicating the completion of a process corresponding to the second response from the client apparatus;
transmitting the received completion notice to the management server;
receiving an acknowledgement which corresponds to the completion notice and is transmitted from the management server in response to the completion notice; and
removing the identifier and the first location information corresponding to the identifier the allowance list in response to the received acknowledgement.

18. A non-transitory computer readable medium storing a program that causes a computer including a controller, a communication unit, and a memory that stores an allowance list including location information of a server which is allowed to be connected to perform:
allowing the communication unit to receive, from a client apparatus, a first request to inquire whether software is updated;
allowing the communication unit to transmit the first request to a management server;
allowing the communication unit to receive a first response which is transmitted from the management server in response to the first request and includes first location information indicating a location of a storage server storing the software;
allowing the controller to add the first location information in the first response to the allowance list;
allowing the communication unit to transmit the first response to the client apparatus;
allowing the communication unit to receive, from the client apparatus, a second request which is a software download request and includes second location information indicating a location of a server, which is a connection destination;
allowing the communication unit to transmit the second request to the storage server when the second location information in the second request corresponds to the first location information in the allowance list stored in the memory;
allowing the communication unit to receive a second response which is transmitted from the storage server in response to the second request and includes the software;
allowing the communication unit to transmit the second response to the client apparatus;
allowing the communication unit to receive a completion notice indicating the completion of a process corresponding to the second response from the client apparatus;
allowing the communication unit to transmit the received completion notice to the management server;
allowing the communication unit to receive an acknowledgement which corresponds to the completion notice and is transmitted from the management server in response to the completion notice; and
allowing the controller to remove the identifier and the first location information corresponding to the identifier front the allowance list in response to the received acknowledgement.

19. An information processing system comprising:
the information processing apparatus according to claim 1,
the client apparatus;
the management server; and
the storage server,
wherein the client apparatus includes:
a sixth transmitting unit that transmits the first request to the information processing apparatus;
a seventh receiving unit that receives the first response transmitted by the information processing apparatus;
a seventh transmitting unit that transmits the second request to the information processing apparatus;

an eighth receiving unit that receives the second response transmitted by the information processing apparatus; and
an eighth transmitting unit that transmits the completion notice to the information processing apparatus, the management server includes:
a ninth receiving unit that receives the first request transmitted by the information processing apparatus;
a ninth transmitting unit that transmits the first response to the information processing apparatus;
a tenth receiving unit that receives the completion notice transmitted by the information processing apparatus; and
a tenth transmitting unit that transmits the acknowledgement to the information processing apparatus, and the storage server includes:
an eleventh receiving unit that receives the second request transmitted by the information processing apparatus; and
an eleventh transmitting unit that transmits the second response to the information processing apparatus.

\* \* \* \* \*